United States Patent Office 3,416,189
Patented Dec. 17, 1968

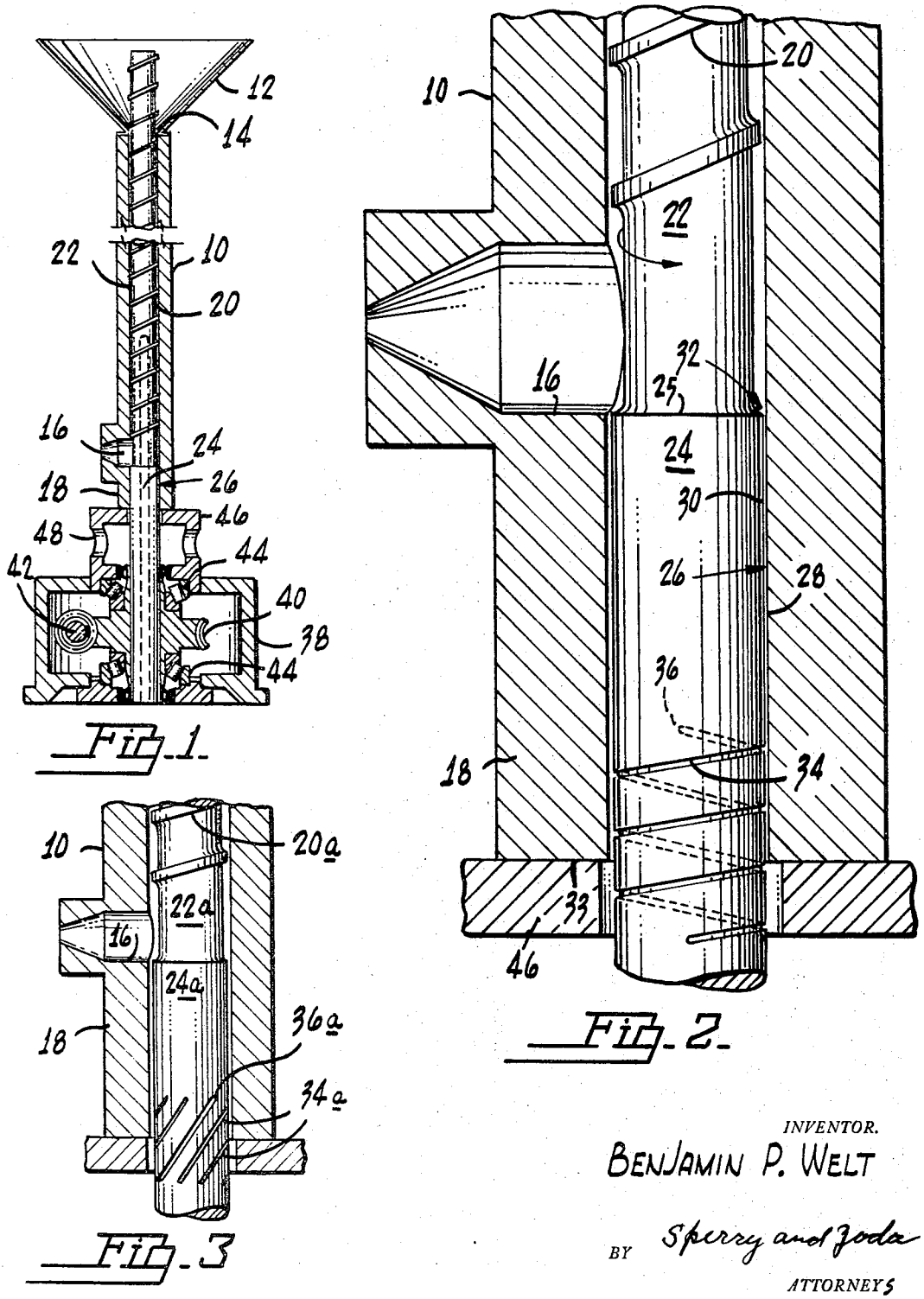

3,416,189
SHAFT SEAL FOR EXTRUDERS OF HEAT-SENSITIVE PLASTICS AND LIKE MATERIALS
Benjamin P. Welt, 16 Hart Drive,
South Orange, N.J. 07079
Filed Mar. 10, 1967, Ser. No. 622,219
10 Claims. (Cl. 18—12)

ABSTRACT OF THE DISCLOSURE

The feed screw shaft of a plastic materials extruder bears in a land in the extruder barrel. Material forced between the shaft and land forms a seal through which there is zero leakage during off periods. A helical groove in the shaft extends for part of the seal land length, and during duty cycles, is effective to reduce the length of the land. The shortened land is inadequate to support zero leakage, so that material bleeds through the seal to replace worn sealing material with fresh material that will serve as a static sealing agent during the next off period.

Background of the invention

Field of invention

The invention pertains to the plastics art and has particular applicability to molding devices of the die expressing type.

Description of the prior art

Currently in widespread usage is an extruder of heat-sensitive materials such as the various combinations of polyvinyl chloride and acetates. Typically, such devices include an elongated barrel, in which the material is fed in an axial direction by a feed screw. As shown by such patents as Hendry 3,137,035 issued June 16, 1964 and Welt 3,278,986 issued Oct. 18, 1966, the extruder may be provided with a side discharge port adjacent one end of the barrel, with the shaft of the feed screw bearing in said end of the barrel.

One of the most troublesome and persistent problems arising in the construction and operation of devices of this type has to do with the maintenance of an effective seal where the shaft bears in the barrel end downstream from the discharge port. The material extruded by devices of the type described is heat-sensitive and subject to rapid decomposition. The various combinations of polyvinyl chloride and acetates, for example, retain their plasticity at a given, elevated temperature only for a comparatively limited period of time. Beyond the time and temperature limitations to which such materials are subject, they decompose swiftly, becoming hard and crystalline. In these circumstances, the materials take on a severely abrasive characteristic that defies conventional sealing means. Working into a shaft bearing or its associated seal, the extrusion product abrades the surface of the shaft as well as of the journal in which it rotates, and swiftly destroys the sealing action.

It has been proposed, heretofore, to expel a quantity of the plastic material through the bearing to utilize it as a lubricant, and to insure against the entry of contaminants. This is the purpose of the Hendry patent, referred to above. In a related field, somewhat the same expedient is suggested in Blackburn Patent 3,072,957.

The difficulty with a solution to the problem such as offered by the prior art noted above, is that bleeding of the material through the seal is continuous. This means that the bleeding or leakage goes on as long as there is material within the barrel under pressure and in a plastic state. Such bleeding continues both during actual duty cycles when the feed screw is rotating for the purpose of extruding plastic material, and during off or rest periods when the feed screw is stationary. It is understood that an extruder of this type may be used with equipment connected directly to the extruder outlet. Pressure within the barrel, or within directly connected equipment, such as an accumulator, shaping die, or mold (not shown) is static between duty cycles at the discharge end, remaining at a value such as to continue to force the material through the seal, thus resulting in an immediate pressure drop within said directly connected equipment, as well as a loss of material directly through the seal. Thus, the reduction of seal wear is achieved only by an increase in the amount of waste and a failure to maintain critical pressure within the directly connected equipment, so that the advantages of the prior art devices aming to solve this problem are offset to a marked degree by their disadvantages.

The present invention offers as a solution to the problem of seal deterioration a seal structure that provides for explusion of decomposed, hard material while yet holding waste to a low, acceptable rate.

Brief description of the drawing

FIGURE 1 is a longitudinal sectional view through an extruder having a seal structure according to the present invention;

FIGURE 2 is an enlarged, detail, fragmentary longitudinal sectional view through the lower portion of the extruder, taken at the location of the seal structure; and FIGURE 3 is a view similar to FIGURE 2, but on a smaller scale, showing a modified construction.

Description of the preferred embodiments

A barrel 10, preferably but not necessarily positioned vertically, has at one end a feed hopper 12 in which plastic materials, not shown, are deposited for passage into the barrel through its inlet 14. Within the barrel, said materials are fed longitudinally of the barrel from the inlet to a discharge port 16 opening laterally through the side wall of the barrel in close proximity to the end portion 18 thereof. The materials are fed through the barrel by a feed screw 20 having a shaft 22 having an axial extension 24 beyond discharge port 16 bearing in end portion 18. As shown in FIG. 2, the diameter of extension 24 is greater than the portion of shaft 22 disposed immediately adjacent thereto opposite discharge port 16, so that there is a circumferential shoulder 25 that defines the inner end of the extension 24 of the shaft 22.

The enlargement of the shaft diameter at the plane of shoulder 24 also marks the inner end of a seal land 26 of the end portion 18 of the barrel. The diameter of land 26 is greater than the diameter of the shaft extension 24 bearing therein to an extent sufficient to define a small but definite clearance between the confronting surfaces 28, 30 of the extension and land respectively. This clearance forms a sealing-agent-receiving area 32 into which the plastic material is forced to provide a seal between the shaft and barrel, said area being coextensive in length with the seal land. Said length, as seen from FIG. 2, is the distance, measured axially of shaft extension 24, between shoulder 25 and the outer end 33 of the end portion 18 of the barrel.

Formed in the surface of the shaft extension 24 is a helical groove the inner end 36 of which is disposed inwardly a short distance from the barrel end 33. Groove 34 extends continuously beyond the barrel end 33, terminating at any desired location beyond the end of the barrel, short of a gear box 38 having worm gear 40 keyed or otherwise made rotatable with the shaft extension 24, and driven by a worm 42 that is provided with a suitable driving connection to a source of motive power, not shown. Thrust bearings 44, 44 are provided for the shaft extension at opposite ends of the gear box, and extending about the shaft extension, between the gear box and the barrel, is an enclosure 46 open as at 48 to facilitate cleaning of worn plastic materials expelled through the seal structure.

The construction of the gear box, drive means, and enclosure do not constitute part of the present invention, being illustrated primarily to show the relationship of the seal structure to the other main components of the extruder.

As previously noted herein, an extruder of the character illustrated and described above is designed particularly, though not solely, for expressing heat-sensitive plastic materials such as the various combinations of polyvinyl chloride and acetates. Such materials, also as noted above, are subject to swift decomoposition, and remain plastic, at given elevated temperatures, only for a period of time that is strictly limited, and that is dependent upon the degree of temperature to which the materials are subjected.

Such material, when fed longitudinally of the barrel by means of the feed screw, is under heavy pressure in the area of the discharge port, it being common to develop head pressures up to 10,000 p.s.i. Of importance, in this connection, is the fact that even when the shaft is momentarily at rest between duty cycles, the pressure may be required to be undiminished, and remain static. As a result, the plastic material is at all times, whether during the actual duty cycle or the off period between duty cycles, under heavy pressure tending to force it into the seal area 32 defined between confronting surfaces 28, 30 of extension 24 and land 26 between shoulder 25 and barrel extremity 33.

It becomes apparent that in these circumstances, one might assemble a machine with the clearance between surfaces 28, 30, and the length of the seal area 32, selected to result in zero leakage of a particular material through the seal. One would do this by making the clearance small enough, and the land length long enough, to prevent leakage, both during duty cycles and off periods, of a given material extruded under a known head pressure at a temperature the value of which imparts a selected viscosity to the material.

If this is done, however, the material, entering area 32 to serve as a sealing agent between the shaft extension and the seal land, would at the outset be static, both during the duty cycles and the off periods therebetween.

This, however, would be highly undesirable, since the materials would swiftly decompose in the area between surfaces 28, 30. They would thus become hard and crystalline, acting abrasively upon surfaces 28, 30 to an extent that would in short order effectively destroy the sealing land.

When the clearance between extension 24 and land 26 becomes enlarged to the point that zero leakage would no longer exist due to the abrasive action discussed above, the plastic material would begin to leak through the seal continuously, both during duty cycles and off periods by reason of the static head pressure within the barrel. The result would be continuous leakage to an extent that would cause a drop in pressure within directly connected equipment below a critical value, and that would in addition raise the wastage rate above commercially acceptable minimums.

The operation of the seal structure constituting the present invention may now be noted, and it is important, first, to observe that the clearance between surfaces 28, 30, and the length of the seal land defined between shoulder 25 and barrel extremity 33, are established to assure zero leakage during off periods between duty cycles, during which periods the shaft 22 is at rest but the plastic material within the barrel is maintained at a selected viscosity by application of heat of given temperature.

Groove 34, does not, at this time, affect adversely the functioning of the seal land to assure zero leakage during off periods. When, however, the next duty cycle begins and the shaft 22 starts to rotate, groove 34 instantaneously becomes a means to temporarily disable the sealing action for the extent of the seal land length that is measured axially of shaft extension 24 from inner end 36 of groove 34 to the barrel extremity 33. The reason is that the grove is a positive means for removing from area 32, and expelling through barrel end 33, any material that lies between surfaces 28, 30 over the axial distance measured between groove end 36 and barrel end 33. Since such material is now in movement, it obviously is no longer a static seal, thereby effecting a reduction in the effective seal length of the land to a new, shorter length which measured axially of shaft extension 24 extends from shoulder 25 to the inner end 36 of the groove.

This shorter length of the land, which exists only during rotational movement of the shaft, is selected to be inadequate to produce a zero leakage characteristic. In other words, the relatively short length of the seal land, taken with the given clearance between surfaces 28, 30, cannot support zero leakage in view of the head pressure within the barrel, and the viscosity of the material.

Under these circumstances, all the material between shoulder 25 and barrel extremity 33, that is, all the material in the sealing area, goes into movement in the direction of the barrel end 33 and is expelled during the duty cycle.

As soon as the duty cycle ceases, and the next off period begins, the material in the seal area again becomes static and zero leakage once more asserts itself instead of the controlled bleed that persists during the duty cycle. In effect, the invention embraces the changing of the length of the seal land from a long land that is provided during off periods and is of a length sufficient to support zero leakage, to a short land that exists during duty cycles, and is of a length deliberately producing controlled bleed. In this way, wastage is reduced far below that which persists in seal constructions in which there is continuous bleeding or leakage. The groove 34, thus, is a means to temporarily disable the sealing characteristics of the land for a part of its length sufficient to produce a material bleeding action where previously there had been no leakage whatever.

In FIG. 3, I have shown a modified construction in which the seal structure is identical in all material respects to that shown in FIGURES 1 and 2. The only difference is that in FIGURE 3, shaft 22a, having extension 24a, has a plurality of steeply pitched helical grooves 34a rather than a single groove 34. Grooves 34a have inner ends 36a which may be disposed substantially at the same location as the end 36 of groove 34, in the sense of the distance from shoulders 25 and barrel extremity 33. Grooves 34a, like groove 34, are of the same hand as the thread of the feed screw 20a.

In FIG. 3, the pitch of the grooves 34a is greater than that of the feed screw proper, while in FIGURE 2, the pitch of groove 34 is lower than that of the feed screw. The invention operates equally well in both instances, and it may be further noted that in FIGURE 2, there may be a plurality of grooves 34 pitched less steeply than the feed screw thread, rather than a single groove as shown. Similarly, in FIG. 3, there may quite possibly be a single groove 34a rather than a multiplicity thereof as shown.

The dimensional requirements of the seal structure will vary according to the pressures developed, materials processed, and other factors. It is advisable to standardize construction as much as possible, and this has been achieved in a typical arrangement described below. Polyvinyl chloride, as well known, is one of the more sensitive volume materials, and in a typical working embodiment a determination of dimensional requirements was based on such material. In this arrangement, the clearance between surfaces 28, 30, was selected to be in the nature of .001 to .003 inches, with the overall length of the sealing land, measured axially of shaft extension 24 from shoulder 25 to barrel extremity 33, being approximately 3 times the diameter of the shaft extension. Groove 34 was extended inwardly along the seal land from barrel extremity 33 a distance, measured axially of shaft extension 24, equal to approximately ⅓ of the overall length of the land.

In these circumstances, and with the viscosity of the material maintained at the prescribed temperatures found desirable in the art for extrusion thereof, the rate of discharge or bleed of the material during duty cycles was approximately .077% of the discharge through the port 16. There being zero leakage during off periods, this becomes the wastage rate, and is well within commercially accepted minimums. At the same time, the rate is more than adequate to provide replenishment of worn sealing material to avoid crystalline structure of said material and assure against abrasion of the sealing surfaces.

The rate indicated, it is also worthy of note, permits standardization, that is, the rate represents a figure that can be considered as a maximum allowable for economical considerations, and as a minimum for functional reasons or sealing efficiency.

Outside of a standardized, general purpose dimension as discussed above, special constructions may be needed according to particular pressures and material viscosities. In these circumstances, the length of the land might have to be changed, and this is true also of the clearance between surfaces 28, 30. Then too, the amount of bleed desired during a duty cycle may affect the selection of the depth of the helix groove, its width, and its pitch. In every instance, however, the basic, essential concept of the invention would remain unchanged, namely, the provision of a land that is sufficient during off periods to produce zero leakage, and that has incorporated therein a means to temporarily reduce said lengths during a duty cycle, to change the sealing characteristics from one of zero leakage to one of controlled bleed during, and only during, the duty cycle.

Thus, by reason of the invention, wastage of material is kept to a desirable low value, and additionally, loss of pressure within directly connected equipment is prevented during off duty cycles of the extruder.

I claim:
1. In a plastic materials extruder of the side discharge type including a barrel (10) formed with an inlet (14) and with a side discharge port (16) located adjacent one end portion (18) of the barrel, and a feed screw (20) having a shaft (22) extending from the inlet to the discharge port and having an axial extension (24) bearing rotatably in said end portion of the barrel: an improved seal structure utilizing said materials as a sealing agent and comprising:
   (a) A sealing land (26) in said end portion, said extension and land having confronting surfaces (28, 30) respectively, spaced closely apart to define therebetween an area (32) into which said materials flow from the barrel proper to form a seal, said area being of an overall length selected to produce zero leakage therethrough during off periods occurring between duty cycles of the extruder; and
   (b) Means (34 or 34a) operative during each of said duty cycles to reduce the effective seal length of said area to an extent to destroy the zero leakage characteristic thereof and produce in its stead a bleed of said material therethrough, thereby to recharge the area with fresh sealing material for each of said off periods.

2. A seal structure as in claim 1 wherein said means is formed in one at least of the confronting surfaces of said extension and land.

3. A seal structure as in claim 1 wherein said means is formed in the surface of said extension.

4. A seal structure as in claim 3 wherein said means extends for part only of the overall length of the seal area.

5. A seal structure as in claim 4 wherein said confronting surfaces are smooth and unbroken over the remainder of said length of the seal area.

6. A seal structure as in claim 5 wherein said means comprises at least one helical groove (34 or 34a).

7. A seal structure as in claim 6 wherein said groove is of the same hand as the thread of the feed screw.

8. A seal structure as in claim 7 wherein the portion of said extension in which said groove is formed is of a diameter equal to the diameter of the smooth-surfaced, unbroken portion of the extension.

9. A seal structure as in claim 8 wherein said diameter of the extension portion is constant over the full length of said seal area.

10. A seal structure as in claim 9 wherein said land is of constant diameter and has a smooth unbroken surface over the full length of the seal area.

References Cited

UNITED STATES PATENTS

| | | | |
|---|---|---|---|
| 3,137,035 | 6/1964 | Hendry | 18—125 |
| 3,199,145 | 10/1965 | Tremersma | 18—123 |
| 3,278,986 | 10/1966 | Welt | 18—125 |
| 3,331,101 | 7/1967 | Thomas | 18—125 |
| 3,354,504 | 11/1967 | Lehner | 18—123 |

WILLIAM J. STEPHENSON, *Primary Examiner.*